(12) United States Patent
Adachi et al.

(10) Patent No.: US 7,405,023 B2
(45) Date of Patent: Jul. 29, 2008

(54) ALKALINE DRY BATTERY

(75) Inventors: Mitsuji Adachi, Suita (JP); Takayuki Umebayashi, Osaka (JP); Yasuhiko Shoji, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 116 days.

(21) Appl. No.: 10/493,548

(22) PCT Filed: Oct. 17, 2002

(86) PCT No.: PCT/JP02/10807

§ 371 (c)(1),
(2), (4) Date: Apr. 22, 2004

(87) PCT Pub. No.: WO03/038932

PCT Pub. Date: May 8, 2003

(65) Prior Publication Data

US 2004/0258994 A1    Dec. 23, 2004

(30) Foreign Application Priority Data

Nov. 1, 2001    (JP)    ............... 2001-336580

(51) Int. Cl.
*H01M 4/50*    (2006.01)
*H01M 4/62*    (2006.01)

(52) U.S. Cl. .................... 429/224; 429/231.5; 429/206; 429/218.1; 429/232

(58) Field of Classification Search ................ 429/224, 429/231.5, 206, 218.1, 232
See application file for complete search history.

(56) References Cited

U.S. PATENT DOCUMENTS

| 3,689,219 | A | | 9/1972 | Craig |
| 5,342,712 | A | | 8/1994 | Mieczkowska et al. |
| 5,599,644 | A | * | 2/1997 | Swierbut et al. ............ 429/224 |
| 6,361,899 | B1 | * | 3/2002 | Daniel-Ivad et al. ........ 429/224 |
| 7,294,429 | B2 | * | 11/2007 | Anglin et al. ................. 429/82 |

FOREIGN PATENT DOCUMENTS

| DE | 33 27 568 A1 | 4/1985 |
| DE | 33 37 568 A1 | 4/1985 |
| EP | 747 982 | 12/1996 |

(Continued)

OTHER PUBLICATIONS

Isle Past et al., Mapping the distribution of doping elements in electrolytically doped manganese dioxide by EFTEM and EELS, Monatshefte Fur Chemie, vol. 132, Apr. 2001, pp. 541-549.*

(Continued)

*Primary Examiner*—Patrick Ryan
*Assistant Examiner*—Angela Martin
(74) *Attorney, Agent, or Firm*—McDermott Will & Emery LLP

(57) ABSTRACT

The present invention provides an alkaline dry battery which has excellent heavy load and intermediate load discharge characteristics, and in which reduction in light load discharge characteristic is suppressed. In the alkaline dry battery comprising: a negative electrode; an alkaline electrolyte; and a positive electrode comprising manganese dioxide and a graphite powder, the positive electrode is added with an additive selected from the group consisting of $Ti(OH)_4$ and $Ti(OH)_2$.

4 Claims, 1 Drawing Sheet

FOREIGN PATENT DOCUMENTS

| | | |
|---|---|---|
| EP | 0 789 410 | 8/1997 |
| EP | 0 863 581 | 9/1998 |
| JP | 09-139201 | 5/1997 |
| JP | 2004-078203 | 11/2004 |
| WO | WO 00/30198 | 5/2000 |

OTHER PUBLICATIONS

Supplementary European Search Report dated May 21, 2007, recieved in corresponding European Application No. EP 02 775367.

Hisahiko Einaga, Hydrolysis of Titanium (iv) in Aqueous (Na, H) CI Solution, Journal of the Chemical Society, Dalton Transactions, Chemical Society, 1979, pp. 1917-1919.

Ilse Papst et al., Mapping the Distribution of Doping Elements in Electrolytically Doped Magnanese Dioxide by EFTEM and EELS, Monatshefte Fur Chemie, vol. 132, Apr. 2001, pp. 541-549.

L. Binder et al., Production and Characterisation of Electrolytically Doped Manganese Dioxide, Journal of Power Sources, vol. 70, 1998, pp. 1-7.

L.A. Xue et al., The Influence of Ionic Radii on the Incorporation of Trivalent Dopants into $BaTiO_3$, Materials Science and Engineering, vol. 2, No. B01, Nov. 1988, pp. 193-201.

* cited by examiner

ALKALINE DRY BATTERY

TECHNICAL FIELD

The present invention relates to an alkaline dry battery which has an excellent positive electrode utilization rate during discharge under a heavy load and an intermediate load, and in which a decrease in electrical capacity during discharge under a light load is suppressed.

BACKGROUND ART

With the recent advancement and development of portable information devices such as cellular phones, there has been a demand for alkaline dry batteries capable of discharging under a heavy load.

In response to this, for the purpose of improving heavy load discharge characteristics of alkaline dry batteries, the conventional alkaline dry batteries have employed, as a positive electrode additive, an anatase titanium oxide (e.g., Japanese Laid-Open Patent Publication No. Hei 8-510355), a titanium-containing composite oxide (e.g., Japanese Laid-Open Patent Publication No. Hei 9-139201) and a barium compound such as barium sulfate (e.g., International Publication No. WO 00/30198).

However, although the addition of titanium oxide, a titanium-containing composite oxide or a barium compound to a positive electrode improves the heavy load discharge characteristic to some extent, it does not yield a sufficient active material utilization rate. Moreover, in order for the aforesaid conventional additives to provide sufficient effects, they need to be employed in a large amount. Accordingly, a filled amount of manganese dioxide which serves as an active material in the positive electrode decreases, thereby decreasing the electrical capacity of the battery and reducing the light load discharge characteristic thereof. This also causes a great inconvenience for the use of equipment such as timepieces which require discharging under a light load, since there still exists a considerable demand for alkaline dry batteries.

It is an object of the present invention to provide an alkaline dry battery which has excellent heavy load and intermediate load discharge characteristics, and in which reduction in light load discharge characteristic is suppressed.

DISCLOSURE OF INVENTION

In order to solve the foregoing problems, the present invention provides an alkaline dry battery which comprises: a negative electrode; an alkaline electrolyte; and a positive electrode comprising manganese dioxide and a graphite powder, characterized in that the positive electrode comprises an additive selected from the group consisting of $Ti(OH)_4$ and $TiO(OH)_2$.

It is preferable that the positive electrode comprises 0.01 to 5 parts by weight of the additive per 100 parts by weight of manganese dioxide.

When the positive electrode comprises $TiO(OH)_2$, the average particle size of $TiO(OH)_2$ is preferably $10^{-9}$ to $10^{-8}$ m.

BEST MODE FOR CARRYING OUT THE INVENTION

Figure 1:
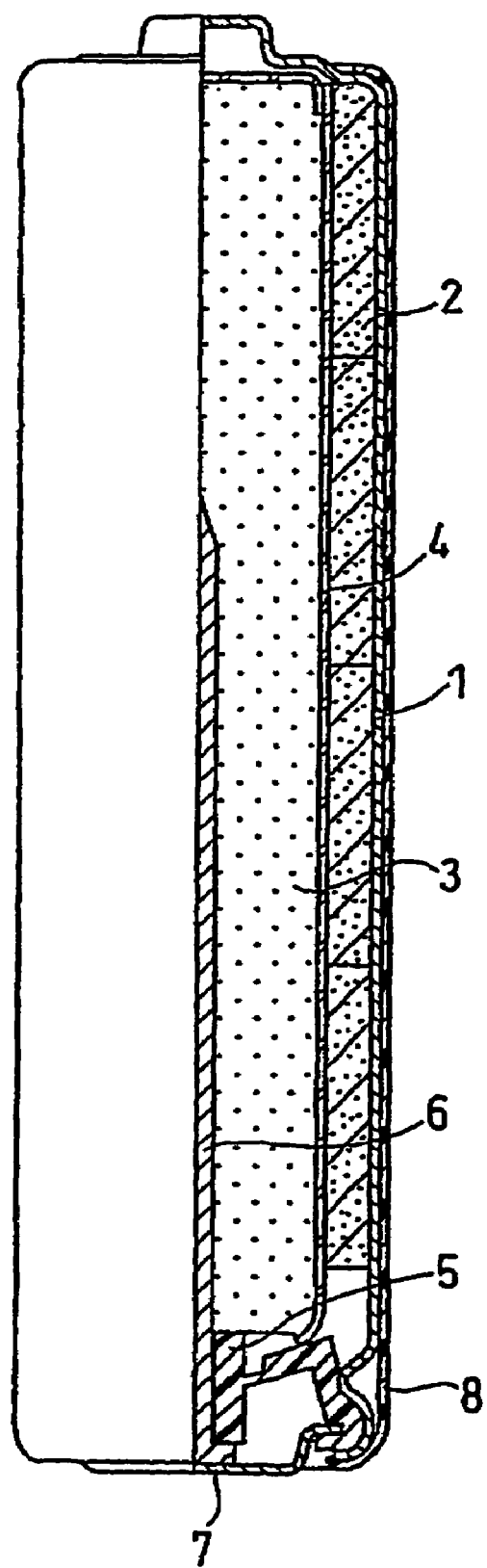
FIG. 1 is a front view, partly in cross section, of one example of an alkaline dry battery in accordance with the present invention.

The present invention improves the positive electrode active material utilization rate during discharge under a heavy load and an intermediate load by containing at least one selected from the group consisting of $Ti(OH)_4$ and $TiO(OH)_2$ in the positive electrode.

On the other hand, although the proportion of the positive electrode active material in the positive electrode material mixture is reduced by the addition of the aforesaid additives to the positive electrode, the filling properties of the positive electrode material mixture are improved by the addition and the filled amount of the positive electrode active material increases under the same molding conditions since these additives have functions as a binder. The addition of the aforesaid additives in the amount range in accordance with the present invention therefore does not decrease the filled amount of the positive electrode active material, so that reduction in light load discharge characteristic can be suppressed.

As thus described, the feature of the present invention lies in that the positive electrode comprises manganese dioxide as a positive electrode active material, a graphite powder as a conductive agent and at least one selected from the group consisting of $Ti(OH)_4$ and $TiO(OH)_2$ as an additive.

It is thought that containing these additives in the positive electrode improves the electrolyte retention in the positive electrode active material to suppress an increase in internal resistance at the end of discharge, which is caused by an insufficient supply of the electrolyte into the positive electrode active material, thereby preventing a rapid decrease in voltage at the end of discharge.

$TiO(OH)_2$ in the present invention is in the form of fine powder and has a particle size of $10^{-9}$ to $10^{-8}$ m, which is much smaller than particle sizes ($10^{-7}$ to $10^{-5}$ m) of anatase titanium oxides conventionally used as positive electrode additives and, therefore, $TiO(OH)_2$ has a larger contact area with the positive electrode active material when added to the positive electrode in a certain amount. Accordingly, an effect greater than conventional effects can be obtained by the addition of a small amount of $TiO(OH)_2$, and this is desirable as the additive.

A particle size $TiO(OH)_2$ of greater than $10^{-8}$ m results in a decreased surface area of the particles, reducing the effect thereof.

Furthermore, when added to a material mixture comprising manganese dioxide and a graphite powder, these additives also function as a binder to improve the moldability of the positive electrode, thereby providing the effect of increasing the filled amount thereof.

It is preferable that the positive electrode comprises 0.01 to 5 parts by weight of at least one selected from the group consisting of $Ti(OH)_4$ and $TiO(OH)_2$ per 100 parts by weight of manganese dioxide. The reason is that the content of less than 0.01 part by weight results in insufficient improvement in heavy load and light load discharge characteristics, and the content of more than 5 parts by weight causes reduction in light load discharge characteristic. Further, containing 0.5 to 3 parts by weight per 100 parts by weight of manganese dioxide is particularly preferred.

As the manganese dioxide and the graphite powder, conventionally used ones may be used. Similarly, as the negative electrode and the alkaline electrolyte, conventionally used ones can be employed.

In the following, the present invention is specifically described by way of examples; however, the present invention is not limited thereto.

EXAMPLES 1 TO 5

FIG. 1 shows a front view, partly in cross section, of an alkaline dry battery fabricated in examples of the present invention.

In FIG. 1, a battery case 1 accommodates therein a positive electrode material mixture 2 molded into short cylindrical pellets, a gel negative electrode 3 and a separator 4. As the battery case 1, a steel case whose inner surface is nickel-plated can be employed. A plurality of positive electrode material mixtures 2 are placed in intimate contact with the inner surface of the battery case 1. Further, the separator 4 is disposed inside the positive electrode material mixture 2, and the inside thereof is filled with the gel negative electrode 3.

The positive electrode material mixture 2 was prepared as follows:

First, manganese dioxide and graphite were mixed in a weight ratio of 90:10, and $Ti(OH)_4$ was further added in predetermined amounts (x part(s) by weight) listed in Table 1 per 100 parts by weight of manganese dioxide, followed by mixing. It is to be noted that $Ti(OH)_4$ used in the present example had an average particle size of $10^{-6}$ m. Three parts by weight of an alkaline electrolyte was added per 100 parts by weight of the obtained mixture, which was sufficiently stirred and then compression molded into flakes. Subsequently, the positive electrode material mixture in flake form was pulverized into granules, followed by classifying with a sieve, and those having 10 to 100 mesh were compression molded into hollow cylindrical shape to give the positive electrode material mixture 2 in pellet form. Two pieces of this positive electrode material mixture 2 were inserted into the battery case 1, and then remolded by means of a compressing jig so as to be placed intimate contact with the inner wall of the battery case 1.

In the aforesaid manner, a separator 4 having a bottom and cylindrical shape was disposed at the center of the positive electrode material mixture 2 placed inside the battery case 1, and a predetermined amount of an alkaline electrolyte was injected into the separator 4. After an elapse of a predetermined time, the separator 4 was filled with the gel negative electrode 3 comprising an alkaline electrolyte, a gelling agent and a zinc powder.

As the gel negative electrode 3, a gel comprising 1 part by weight of sodium polyacrylate as a gelling agent, 33 parts by weight of 40 wt % sodium hydroxide as an alkaline electrolyte and 66 parts by weight of the zinc powder was employed.

As the separator 4, non-woven fabric made mainly of polyvinylalcohol fibers and rayon fibers was used.

Subsequently, a negative electrode current collector 6 was inserted in the center of the gel negative electrode 3. It should be noted that a gasket 5 and a bottom plate 7 serving as a negative electrode terminal were combined integrally with the negative electrode current collector 6.

Then, the opening end of the battery case 1 was clamped to the periphery of the bottom plate 7, with the end of the gasket 5 disposed therebetween, to seal the opening of the battery case 1. Finally, the outermost surface of the battery case 1 was covered with an outer jacket label 8, thereby giving an alkaline dry battery.

The alkaline dry batteries thus obtained were evaluated in the following manner.

[Evaluation]

In order to evaluate the heavy load discharge characteristic, the alkaline dry battery in fresh state (immediately after fabrication) was continuously discharged with a 2.2 Ω load until the off-load voltage reached 0.9 V to measure the discharge duration time. With a result obtained using an additive-free alkaline dry battery (Comparative Example 1) considered as the reference value 100, the heavy load discharge characteristic was represented as an index. The results of the evaluation were shown in Table 1.

Further, the intermediate load discharge characteristic was evaluated in the same manner as in the case of the heavy load discharge characteristic, except that the battery was continuously discharged with a 10 Ω load. Moreover, the light load discharge characteristic was evaluated in the same manner as in the case of the heavy load discharge characteristic, except that the battery was continuously discharged with a 39 Ω load. The results of these evaluations were also shown in Table 1.

EXAMPLES 6 TO 10

Positive electrode material mixtures 2 were prepared in the same manner as in Example 1, except for adding $TiO(OH)_2$, in place of the positive electrode additive $Ti(OH)_4$, in predetermined amounts (x part(s) by weight) listed in Table 1 per 100 parts by weight of manganese dioxide, to obtain alkaline dry batteries. The characteristics of the alkaline dry batteries were evaluated in the same manner as in Example 1. It is to be noted that $TiO(OH)_2$ used in the present example had an average particle size of $10^{-9}$ m.

COMPARATIVE EXAMPLES 1 TO 4

Positive electrode material mixtures 2 were produced in the same manner as in Example 1, except for adding $TiO_2$, in place of the positive electrode additive $Ti(OH)_4$, in predetermined amounts (x part(s) by weight) listed in Table 1 per 100 parts by weight of manganese dioxide to obtain alkaline dry batteries. It is to be noted that $TiO_2$ had an average particle size of $10^{-6}$ m. The characteristics of the alkaline dry batteries were evaluated in the same manner as in Example 1.

TABLE 1

| Example No. | Amount added (part(s) by weight) | | | Discharge duration time | | |
| --- | --- | --- | --- | --- | --- | --- |
| | $TiO_2$ | $Ti(OH)_4$ | $TiO(OH)_2$ | 2.2 Ω | 10 Ω | 39 Ω |
| Com. Ex. 1 | 0 | 0 | 0 | 100 | 100 | 100 |
| Com. Ex. 2 | 0.1 | 0 | 0 | 100 | 101 | 100 |
| Com. Ex. 3 | 1 | 0 | 0 | 107 | 105 | 98 |
| Com. Ex. 4 | 5 | 0 | 0 | 103 | 98 | 94 |
| Example 1 | 0 | 0.001 | 0 | 101 | 100 | 100 |
| Example 2 | 0 | 0.01 | 0 | 105 | 103 | 100 |
| Example 3 | 0 | 1 | 0 | 110 | 106 | 100 |
| Example 4 | 0 | 5 | 0 | 111 | 106 | 99 |
| Example 5 | 0 | 10 | 0 | 111 | 106 | 92 |
| Example 6 | 0 | 0 | 0.001 | 100 | 100 | 100 |
| Example 7 | 0 | 0 | 0.01 | 105 | 103 | 100 |
| Example 8 | 0 | 0 | 1 | 112 | 109 | 100 |
| Example 9 | 0 | 0 | 5 | 113 | 108 | 99 |
| Example 10 | 0 | 0 | 10 | 113 | 109 | 93 |

It is found from Table 1 that both the addition of $Ti(OH)_4$ and that of $TiO(OH)_2$ in an amount of 0.01 to 5 parts by weight per 100 parts by weight of manganese dioxide improved the heavy load discharge characteristic of the alkaline dry battery, without reducing the light load discharge characteristic. As in Example 1 and Example 6, too small an addition of the additive yielded only a little effect of improving the active material utilization rate of the positive electrode, thereby hardly improving the heavy load discharge characteristic. As in Example 5 and Example 10, too large an addition of the additive reduced the light load discharge characteristic.

With respect to the added amount of 1 part by weight, which is considered as optimum, the improvement in characteristics was greater in Example 8 than in Example 3. The reason was presumably that $TiO(OH)_2$ had a particle size of $10^{-9}$ m, which was smaller than that of $Ti(OH)_4$ and thus yielded a larger contact area with the positive electrode active material when added in the same amount, thereby achieving a greater effect of improving the characteristics.

Besides, the same effect was also observed when a mixture of $Ti(OH)_4$ and $TiO(OH)_2$ was added to the positive electrode.

INDUSTRIAL APPLICABILITY

As described above, according to the present invention, it is possible to provide an alkaline dry battery which has excellent heavy load and intermediate load discharge characteristics, and in which reduction in light load discharge characteristic is suppressed.

The invention claimed is:

1. An alkaline dry battery comprising: a negative electrode; an alkaline electrolyte; and a positive electrode comprising manganese dioxide and a graphite powder, characterized in that said positive electrode comprises an additive selected from the group consisting of $Ti(OH)_4$ and $TiO(OH)_2$, wherein said alkaline dry battery is a primary battery.

2. The alkaline dry battery in accordance with claim 1, wherein said positive electrode comprises 0.01 to 5 parts by weight of said additive per 100 parts by weight of manganese dioxide.

3. An alkaline dry battery comprising: a negative electrode; an alkaline electrolyte; and a positive electrode comprising manganese dioxide and a graphite powder, characterized in that said positive electrode comprises $TiO(OH)_2$ as an additive.

4. The alkaline dry battery in accordance with claim 3, wherein the $TiO(OH)_2$ has an average particle size of $10^{-9}$ to $10^{-8}$ m.

* * * * *